W. E. Hawkins,
Caster Holder.
Nº 70,209. Patented Oct. 29, 1867.
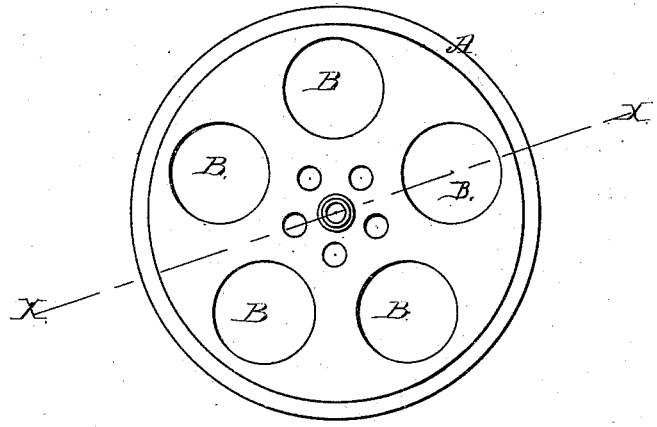
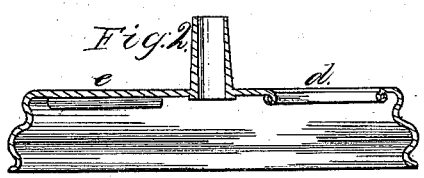
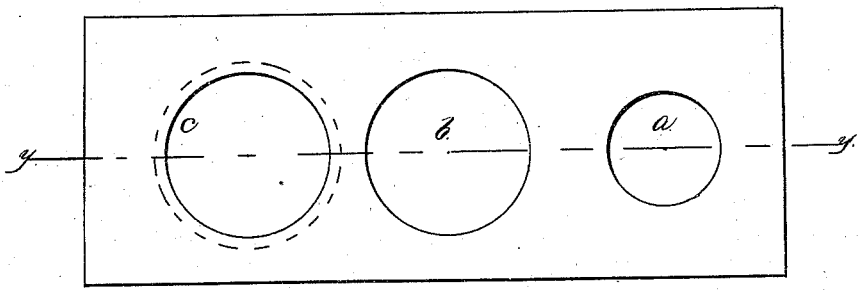
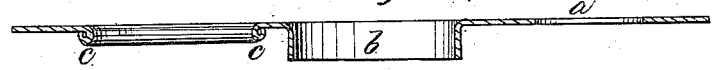
Witnesses:
Theo Tusche
Wm Truvin
Inventor:
Westel E. Hawkins
Per Munn
Attorneys

United States Patent Office.

WESTEL E. HAWKINS, OF NEW YORK, N. Y., ASSIGNOR TO JOSHUA B. GRAVES, OF THE SAME PLACE.

Letters Patent No. 70,209, dated October 29, 1867.

---

IMPROVEMENT IN THE CONSTRUCTION OF CRUET-CASTERS.

---

*The Schedule referred to in these Letters Patent and making part of the same.*

---

TO ALL WHOM IT MAY CONCERN:

Be it known that I, WESTEL E. HAWKINS, of the city, county, and State of New York, have invented a new and useful Improvement in Cruet-Casters; and I do hereby declare that the following is a full, clear, and exact description thereof, which will enable others skilled in the art to make and use the same, reference being had to the accompanying drawings, forming part of this specification.

This improvement has reference to the manner in which the apertures, through which the cruets of a table-caster pass, are formed and completed; and the invention consists in forming the bead on the centre-plate of the caster by a peculiar and greatly improved method, and of one and the same piece of metal, as will be hereinafter described.

Figure 1 represents a centre-plate of a table-caster, showing the holes or apertures in which the cruets are placed.

Figure 2 is a cross-section of the same through the line $x\ x$.

Figure 3 represents a plate, which is designed to illustrate the manner of forming the apertures; and Figure 4 is a section of the same through the line $y\ y$.

Similar letters of reference indicate like parts.

A represents the centre-plate of the caster; B represents the apertures for cruets. C is the centre hole, through which the pivot passes, on which the centre-piece revolves. For the purpose of rendering the plate A sufficiently strong and stiff where the cruets are set in, it has always been customary to punch the holes and then solder on small rings on the under side to form flanges or beads. These rings have to be cast separately, and turned off smooth inside and out in a lathe, and then they are soldered on to the plate around the hole, and the inside or edge of the hole is then finished by scraping and burnishing. But the operation of finishing the holes is necessarily imperfect, as the solder used is softer than the plate, and gives much trouble in the process of burnishing after the silver-plating. A sample of the work done by the common method is herewith submitted. I avoid this roundabout and expensive method of forming the bead around the hole, and all the objections to it, by a very simple mechanical process. I not only do that, but I make a far superior job of it in every respect.

By my method I first punch the hole $a$, fig. 3. With another punch, formed for the purpose, I turn down the edge of the hole, as seen at $b$, same figure. Then with another tool or punch, which has a grooved shoulder, I turn down the edge of the hole $b$ into the form of the bead at $c$, thus forming the cruet-holes through the plate in a very rapid and perfect manner, thereby greatly improving the appearance and cheapening the article. A cross-section of the bead is seen at $d$, fig. 2, and an outside view is given at $e$, same figure. $f$ is a tube on the under side of the centre-plate A, through which the pivot-stand passes.

What I claim as new, and desire to secure by Letters Patent, is—

Forming the centre-plate A and the bead around the cruet-holes of one and the same piece of metal, substantially as shown and described.

The above specification of my invention signed by me this 1st day of March, 1867.

WESTEL E. HAWKINS.

Witnesses:
 WM. F. McNAMARA,
 ALEX. F. ROBERTS.